United States Patent

[11] 3,589,209

[72] Inventor Russell B. Howell
 Burbank, Calif.
[21] Appl. No. 788,450
[22] Filed Jan. 2, 1969
[45] Patented June 29, 1971
[73] Assignee Fairchild Hiller Corporation
 Bay Shore, N.Y.

[54] CABLE OPERATED ACTUATOR ASSEMBLY
 8 Claims, 5 Drawing Figs.
[52] U.S. Cl. .................................................... 74/501
[51] Int. Cl. ..................................................... F16c 1/10
[50] Field of Search ........................................... 74/501,
 501.5, 502

[56] References Cited
 UNITED STATES PATENTS
 3,101,821 8/1963 Henry ............................ 74/501

FOREIGN PATENTS
567,653 2/1945 Great Britain .................... 74/501

Primary Examiner—William F. O'Dea
Assistant Examiner—Wesley S. Ratliff, Jr.
Attorney—Darby and Darby ABSTRACT: A device for pushing a linearly actuable member comprises a pushbutton, cable, and actuator assembly. The pushbutton is coupled to an end of the cable through a cam and cam follower arrangement such that pushing of the button is converted into a pulling force on the cable by camming a yoke attached to the cable. The other end of the cable is connected to the actuator assembly which pushes the member in response to application of a pulling force from the cable. The actuator assembly includes a pivotally mounted lever having two arms forming an acute angle, with the cable being connected to the end of one arm of the lever and the other arm of the lever abutting against the member to be moved, the lever being mounted so that a portion of the actuator body serves as a fulcrum for the entire lever.

PATENTED JUN 29 1971

INVENTOR
RUSSELL B. HOWELL

BY Darby & Darby

ATTORNEYS

INVENTOR
RUSSELL B. HOWELL

BY Darby & Darby

ATTORNEYS

CABLE OPERATED ACTUATOR ASSEMBLY

The present invention relates to a mechanical linkage which is intended to apply a substantial pushing force via a flexible cable to a member to be actuated in response to the actuation of a pushbutton or the like.

Seat reclining mechanisms (for example of the type used in aircraft) generally include a lock for retaining the seat back in a selected position, and, of course, a means for releasing the lock to permit adjustment of the seat back position. The lock may be directly operated or, as is generally the case, it may be actuable from a position remote from the lock (e.g. from an arm rest of the seat). The present invention, in its preferred embodiment, is intended for use with a remotely actuable seat reclining mechanism. Typically, the invention may be used with the seat reclining mechanism illustrated and described in U.S. Pat. Application Ser. No. 650,052, assigned to the assignee of this invention. That application discloses an aircraft seat which includes a lock and a clutch for releasing the lock. When the user wishes to adjust the position of the seat back, a remote pushbutton is pushed to actuate the clutch thereby releasing the lock to permit movement of the seat back. Systems of this general type, wherein a lock can be actuated in response to a relatively slight remote actuator movement, are well known, and the present invention has utility with many types of such systems.

In accordance with the operation of most of such remotely actuable systems, it is only necessary to push the clutch actuator (or other lock releasing member) a small distance, although a substantial amount of force must be applied to push it. In Pat. application No. 650,052 now U.S. Pat. No. 3,477,890 such force was shown applied by means of a rigid lever assembly. However, it is frequently necessary, or at least desirable, to position the lock at a remote location (which may not lie in the same plane as the pushbutton) where the use of a rigid lever assembly as the actuating means is inconvenient or highly impractical. In such cases it is preferable to use a flexible cable through which the actuating force can be applied to the clutch actuator. Inherent in the use of a cable or other nonrigid linkage is the inability to apply a substantial pushing or compressive force to the load as opposed to a pulling or tensioning force. This problem, of course, does not arise in the case of a rigid lever-type linkage. Since the pushing force required to release the lock of U.S. Pat application No. 650,052 is substantial, the prior art actuator assemblies wherein the linkage includes an elongated cable are unacceptable. Accordingly, the main object of the present invention is to provide a cable-type linkage which can be used to permit application of a substantial pushing or compressive force.

Briefly, according to the invention, an actuator assembly includes a lever having two arms forming an acute angle, the lever being pivotally connected at its apex to an actuator body with the end of one arm of the lever adapted to push against the member to be actuated. A cable is connected at one end to the other arm of the lever with the said one arm of the lever adapted to contact a portion of the actuator body such that the body serves as a fulcrum to provide a mechanical advantage for the lever and thus increase the force applied to the member to be actuated. The pulling force may be applied to the other end of the cable by a pushbutton connected thereto through a cam and cam follower arrangement which causes a pushing force on the button to exert pulling force on the cable.

The manner in which the above and other objects of the invention are achieved is more fully explained below with reference to the attached drawings, wherein.

Figure 1:
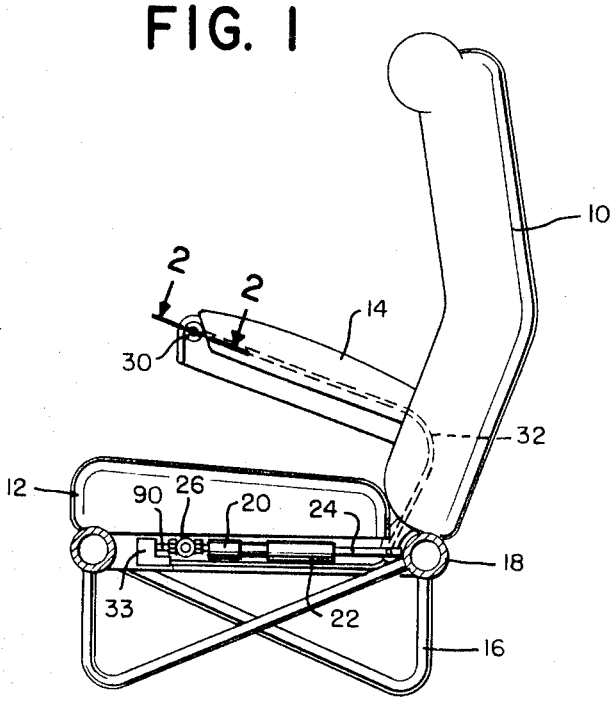
FIG. 1 is a diagrammatic illustration showing the invention as it typically would be employed.
Figure 4:
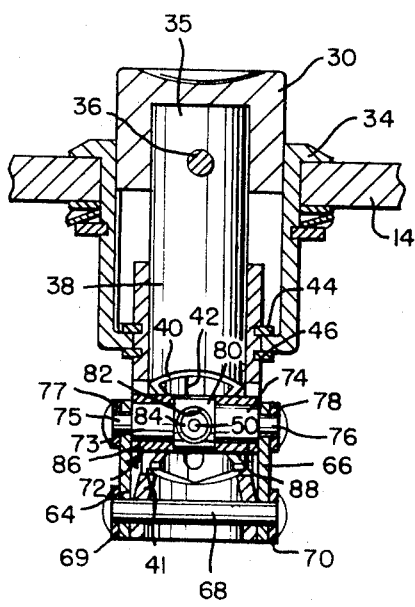
FIG. 4 is a top sectional view of the actuator control member along the line 4—4 of FIG. 2.
Figure 5:
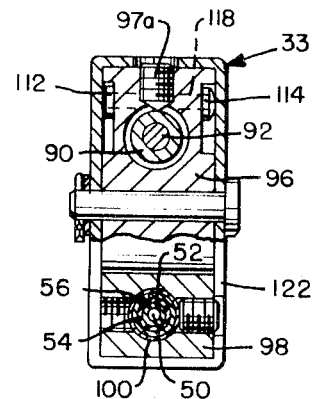
FIG. 5 is a sectional view along the line 5—5 of FIG. 2.

In FIG. 1, which illustrates a typical environment in which the preferred embodiment of the invention can be used, an aircraft seat is shown consisting of a seat-back 10, a seat portion 12, and a pair of armrests 14 (only one of which is illustrated). A tubular frame 16 supports the seat in a standard fashion, with the back 10 being pivotally mounted for rotation about a horizontal frame member 18 relative to the seat 12.

The actual seat reclining mechanism is not a portion of the present invention, and a typical mechanism with which the invention may be used is fully described in the above-mentioned U.S. Pat. application Ser. No. 650,052. Such mechanism comprises a lock housing 20, a cover member 22, and a rear arm 24. The rear arm 24 is adapted to reciprocate relative to the stationary lock housing 20. Movement of arm 24 to the left (retraction) moves the seat-back 10 clockwise, tending to lower it to a reclining position. Moving tube 24 to the right (extension) pivots seat-back 10 in a counterclockwise direction where it will be in an upright position.

In general, all locks include a clutch, or brake, for holding the mechanism with the seat in any desired position. Such locks also have a control (illustratively shown at 26) for releasing the clutch, and a spring or other suitable mechanism (not shown) for moving seat-back 10 to the upright position when the clutch is released in the absence of other forces applied to the seat-back. When the clutch is so released, a person sitting in the seat and leaning against the seat-back, can rotate the back to any desired reclining position, at which point the clutch can be engaged to hold the seat-back in that position by releasing the control 26.

The invention relates to the means for operating the control 26 when a remote control member, such as the pushbutton shown at 30, within the armrest 14 is actuated by the user. According to the invention, pushbutton 30 (or other control member) is coupled to a cable 32 by a connector (not shown in FIG. 1), the other end of cable 32 being connected to an actuator assembly 33 which applies a pushing force to control 26 (to release the clutch) in response to the application of a pulling or tensioning force to the cable. The construction of a preferred embodiment of the invention is described below with reference now to FIGS. 2 through 5.

The pushbutton 30 has a partial central bore and is mounted for reciprocating movement within a cylindrical housing 34 suitably retained in an aperture within the sidewall of armrest 14 in a standard ring and washer as shown. A sleeve 35 is held by a pin 36 within the bore of pushbutton 30, the free end of sleeve 35 extending into a tubular housing extension 38 which is secured to the interior end of housing 34. A portion of the tubular sleeve 35 is cut to form a camming surface 40 (the purpose of which is explained below) lying generally beneath a cutout portion 41 of housing extension 38 as viewed in FIG. 2. A connecting slot 42 is punched in sleeve 35 generally beneath the camming surface 40. The housing extension 38 is retained within the housing 34 by a pair of retaining rings 44 and 46 (FIG. 2) which mate with suitable grooves (not numbered) in the outer surface of the housing extension 38.

The cable 32 is a standard, commercially available cable comprising an inner stainless steel wire 50 centrally disposed within a three-layer construction comprising a heat-shrinkable tubing 52, a nylon sheathing 54, and a braided shielding 56. The end of cable 32 closest to pushbutton 30 terminates in a cylindrical ferrule 58 which may be secured by an epoxy to the cable end. Ferrule 58 fits into a cylinder 60 which extends downwardly from the housing extension 38 around a circular aperture 62 formed within extension 38.

Figure 2:
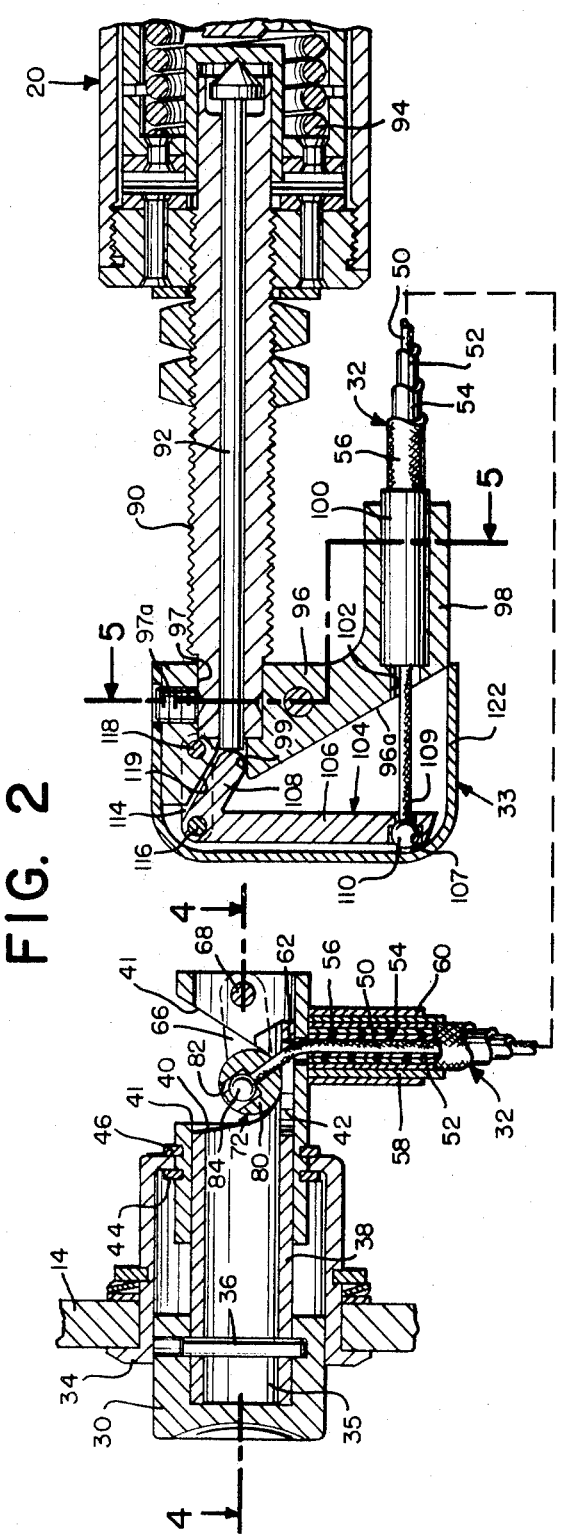
FIG. 2 is a side-sectional view showing the actuator assembly of a preferred embodiment of the invention in a nonactuated condition.

A pair of short links 64 and 66 (FIG. 4) are mounted for pivotal movement on a pin 68 which extends through the right-hand end of the extension 38 as viewed in FIG. 2. Washers 69 and 70 may be inserted over the pin 68 exterior of the links 64 and 66, and both ends of the pin 68 peened to retain the links.

A yoke 72 is mounted in the links 64 and 66 at the end opposite pin 68. The yoke 72 includes axle portions 73 and 74, terminating in protrusions 75 and 76, respectively, which extend through the links 64 and 66 and are peened at their ends over washers 77 and 78 to retain the yoke within the linkage. The center of the yoke, indicated at 80, has a greater diameter than the axle portions 73 and 74 and includes a recess 82 through which one end of the wire 50 extends. The end of wire 50, after it is inserted into recess 82, is swaged onto a retaining ball 84 so as to retain the end of wire 50 within the yoke 72. A pair of rollers 86 and 88 are mounted on the axle portions 73 and 74, respectively, and serve as cam followers which engage the camming surface 40 within the pushbutton sleeve 34. The slope of the curve defining camming surface 40 thus should be such as to cause a horizontal movement thereof to exert sufficient force on the rollers 86 to move them (and cable 50) upwardly to the position shown in FIG. 3.

Figure 3:
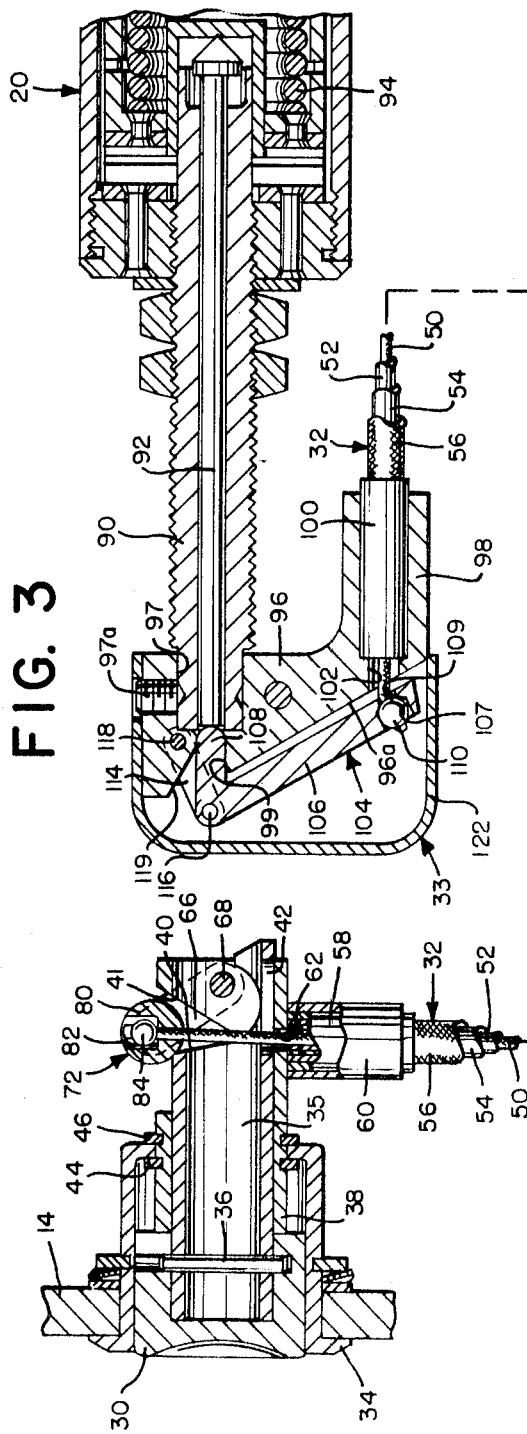
FIG. 3 is a side-sectional view showing the actuator assembly of the invention in an actuated condition.

Referring to FIGS. 2 and 3, a mounting screw 90 is shown extending from the lock housing 20 illustrated in FIG. 1. A spring-loaded clutch actuator member 92 extends axially through mounting screw 90 and is biased by coil spring 94 toward the left-hand side of FIGS. 2 and 3. The member 92 must be pushed to the right for the purpose of releasing the clutch mechanism of the seat adjusting assembly. Actuator 33 applies the necessary force in response to the pulling of wire 50.

The actuator 33 includes a generally triangular body 96 having a slanted interior surface 96a and an external aperture 97 into which is inserted the unthreaded end of mounting screw 90. A setscrew 97a holds the actuator body 96 in place on mounting screw 90. The free end of the member 92 is received within an opening 99 of the actuator body 96. Body 96 also includes an integral sleeve portion 98 which receives a ferrule 100, which in turn retains the end of the cable 32 opposite the pushbutton 30. The wire 50 extends through ferrule 100 and an aperture 102 within actuator body 96 into engagement with one end of a lever 104. Lever 104 includes a long arm 106 forming an acute angle with a shorter arm 108, the end of the short arm 108 resting in opening 97 of actuator body 96 in contact with the spring-loaded member 92. The wire 50 extends through an aperture 109 in the end of long arm 106 where it is swaged onto a ball 110 which rides in a suitable recess 107 within the arm 106.

The lever 104 is pivotally connected at its apex to a pair of links 112 and 114 (see FIG. 5) by a pin 116 which is peened over the lever so as to permit rotation of the lever 104 with respect to links 112 and 114. The opposite ends of links 112 and 114 are pivotally mounted on the actuator body 96 by a pin 118 which is peened to the links 112 and 114. Actuator body 96 includes a flat-sloped surface 119 which extends into the opening 99 and is adapted to engage the short arm 108 of lever 104 to serve as a fulcrum about which lever 104 can pivot in a counterclockwise direction. The entire actuator assembly may be enclosed within a suitable housing 122 shaped to permit the required travel of the long lever arm 106 between the positions of FIG. 2 and FIG. 3.

In operation, when the user wishes to adjust the position of seat-back 10, he pushes the button 30 from the position shown in FIG. 2 to that illustrated in FIG. 3. As the pushbutton 30 carries sleeve 35 toward the position shown in FIG. 3, the camming surface 40 abuts against the cam follower rollers 86 and 88, which ride upwardly on surface 40, causing the links 64 and 66 of yoke 72 to pivot about axle 68 in a clockwise (upward) direction through the cutout portion 41 of housing extension 41.

The upward movement of yoke 72 applies a tensioning or pulling force to the cable wire 50 which transmits this force to the end of arm 106 of lever 104. Accordingly, lever 104 rotates about pin 116 in a counterclockwise direction. However, as lever 104 starts to rotate, the short arm 108 abuts against the sloped surface 119 of body 96 which causes the entire lever 104 along with links 112 and 114 to rotate counterclockwise about pin 118 from the FIG. 2 to the FIG. 3 position. This causes a linear inward movement of the clutch actuator member 92 which, of course, is of sufficient length to actuate the clutch.

The pivotal movement of lever 104 about pin 118 increases the linear movement of its short arm 108 (as compared to a pure pivotal movement about pin 116) and the leverage resulting from abutment of arm 108 against surface 119 produces a mechanical advantage since the length of the lever 104 between the applied force (the end of long arm 106) and the fulcrum (surface 119) is substantially longer than the distance between the fulcrum and the end of short arm 108 which applies the force. Thus, a substantial amount of pressure is applied to the spring-loaded member 92 in moving it to the FIG. 3 position and thereby releasing the clutch for adjustment of the seat.

Although a preferred embodiment of the invention has been illustrated and described, various modifications thereof, will be obvious to those skilled in the art. Furthermore, the invention would operate in the same fashion for any location of the pushbutton relative to the locking mechanism. Accordingly, the invention should not be limited except as defined in the following claims.

I claim:

1. An actuator assembly for use in pushing a member in response to the pulling of an elongated, flexible cable comprising an actuator body, at least one link pivotally connected at one end to said actuator body and extending away from said member, and a lever having two arms forming an acute angle pivotally connected at its apex to the end of said link opposite said one end, the end of one of said arms abutting against said member when said link is in a first position, said one arm abutting against a portion of said body when said lever is pivoted about said link, abutment of said one arm against said body portion causing said link and lever to be pivoted toward said member in a rotational movement about said one end of said link as the other of said arms is pulled toward the actuator body, said other arm being connected to said cable, whereby a pulling force applied to said cable causes said lever to pivot with respect to said link and said link to pivot with respect to said body thereby urging the end of said one arm against said member.

2. An actuater assembly according to claim 1, wherein said one arm is shorter than said other arm.

3. A device for pushing a member comprising;
   a. a pushbutton,
   b. a flexible cable,
   c. connector means responsive to said pushbutton for pulling said cable, said connector means comprising:
      i. a housing,
      ii. an elongated member, connected at one end to said pushbutton and slideable in said housing, the other end of said elongated member including a camming surface, and
      iii. a cam follower yoke pivotally mounted on said elongated member one end of said flexible cable being connected to said yoke, said yoke adapted to engage said camming surface, said camming surface being shaped to cause said yoke to apply a pulling force to said one end of said flexible cable when said pushbutton is pushed, and
   d. actuator means for pushing said member in response to the application of a pulling force to said flexible cable.

4. A device according to claim 3, wherein said actuator means comprises:
   i. an actuator body,
   ii. a link pivotally connected at one end to said actuator body and extending away from said member, and
   iii. a lever having two arms forming an acute angle pivotally connected at its apex to the end of said link opposite said one end, the end of one of said arms adapted to abut against said member, said other arm adapted to abut against a portion of said body such that said body portion can serve as a fulcrum around which said link can pivot with the lever toward said member when the lever is pivoted toward said member, said other arm being connected to said pulling member, whereby tension on said flexible cable causes said lever to pivot with respect to said link and said link to pivot with respect to said body thereby urging the free end of said one arm against said member.

5. A device according to claim 4, wherein said one arm is shorter than the other of said arms.

6. An actuator assembly according to claim 1, including two of said links pivotally connected to said actuator body, the lever being positioned between said links, with a portion of the actuator body between said links forming said body portion.

7. An actuator assembly according to claim 1, wherein the angle between said link and said other arm is greater than said acute angle.

8. An actuator assembly according to claim 7, wherein the angle between said link and said other arm is approximately 90°.